United States Patent [19]

Spranger et al.

[11] 4,118,048

[45] Oct. 3, 1978

[54] WHEELED SAMPLE CASE

[75] Inventors: Douglas M. Spranger, Brooklyn; Malcolm J. Brookes, New York, both of N.Y.; Paul J. Mulhauser, Paramus, N.J.

[73] Assignee: Seiko Time Corporation, New York, N.Y.

[21] Appl. No.: 785,935

[22] Filed: Apr. 8, 1977

[51] Int. Cl.² ............................................. B62B 3/00
[52] U.S. Cl. ............................ 280/47.35; 190/18 A; 280/79.1 R; 280/79.2; 280/35; 280/47.37 R; 280/33.99 T
[58] Field of Search .................. 280/79.1 R, 79.1 A, 280/79.2, 79.3, 33.99 T, 35, 47.35, 47.37; 190/18 A; 312/250, 201, 321, 322, 323, 10 M; 16/110 R; 211/41

[56] References Cited

U.S. PATENT DOCUMENTS

| 440,957 | 11/1890 | McCormack | 312/107 |
|---|---|---|---|
| 1,933,637 | 11/1933 | Plym | 16/110 R |
| 2,511,949 | 6/1950 | Simon | 312/107 |
| 2,789,828 | 4/1957 | Gary | 280/35 |
| 2,981,549 | 4/1961 | Hotton | 280/47.37 R |
| 3,055,723 | 9/1962 | Hilderbrand | 312/200 |
| 3,349,924 | 10/1967 | Maurer | 211/41 |
| 3,379,482 | 4/1968 | Baggott | 312/107 |
| 3,891,230 | 6/1975 | Mayer | 190/18 A |
| 3,905,662 | 9/1975 | Richmond | 312/250 |

Primary Examiner—Robert R. Song
Attorney, Agent, or Firm—Brumbaugh, Graves, Donohue & Raymond

[57] ABSTRACT

A sample case assembly has a pair of open ended containers each of which is supported by one section of a two-section wheeled base member or dolly. The dolly sections are pivotally joined together and with their respective display enclosures are pivoted horizontally between open and closed positions. The containers may be hinged together on one side to form sample cases and detachably connected to the dolly. A plurality of sample cases may be stacked one above the other on the dolly and aligned to pivot open simultaneously with opening of the dolly sections. A transport handle is attached to the uppermost case to facilitate mobility of the assembly.

9 Claims, 8 Drawing Figures

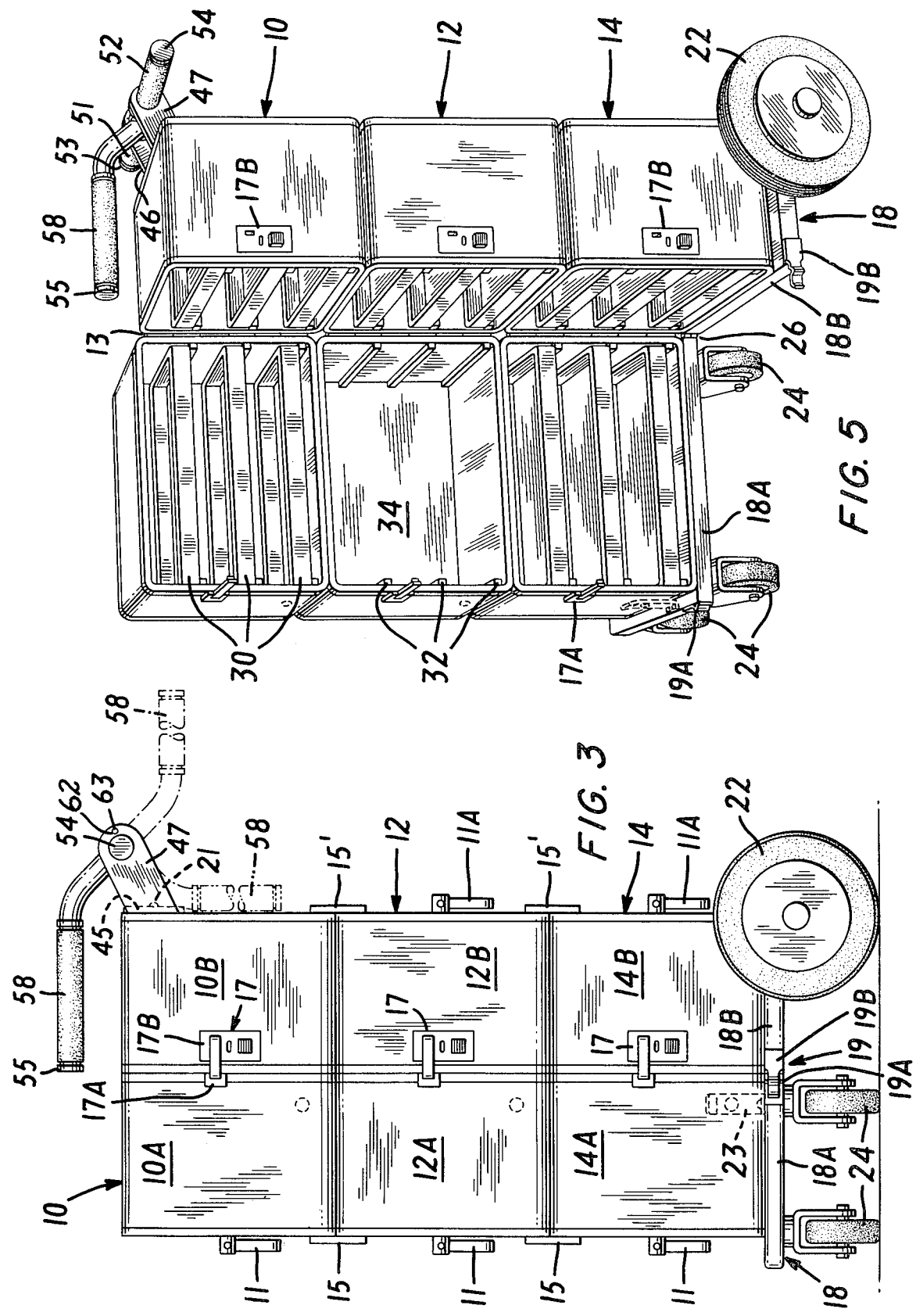

WHEELED SAMPLE CASE

BACKGROUND OF THE INVENTION

This invention relates to sample case assemblies and, more particularly, to nestable sample cases adapted for assembly together with a hinged wheeled device to facilitate their mobility and sample accessibility.

It is often necessary for salesman to transport samples of their products to various places for the purpose of displaying them to potential customers. Hinged display trunks such as that disclosed in U.S. Pat. No. 3,055,723 to H. F. Hildebrand may be used for this purpose. However, such display trunks are bulky and, when filled, quite heavy. As such, they are not conveniently available for use by salesmen in conveying their product samples for display between widely scattered customer locations.

It is also known to nest a plurality of suitcases atop a wheeled cart to facilitate their transporation, as disclosed in U.S. Pat. No. 3,891,230 to F. Mayer, However, these suitcases are drawered and thus not suitable for display purposes. Moreover, even if the suitcases were hinged, they could not be simultaneously opened to provide convenient access to their contents.

SUMMARY OF THE INVENTION

The present invention obviates the difficulties encountered in the transportation and display of a large number of items in a short period of time by providing an assembly of hinged sample cases positioned in vertically stacked relation on a similarly hinged dolly. The hinged sections of each of the cases may be pivoted apart simultaneously along with the dolly to a mutual open position. Display trays are contained in front and back sections of the hinged cases, thus providing the opportunity to carry and to show a great number of items. If desired, printed informational material can be located on the mating interior surfaces of the assembly in such a way that they are fully visible when the cases are opened. The sample materials to be displayed are protected from damage during transportation and will not attract attention at inappropriate times. The cases are detachably interconnected to be unstacked for convenient transportation and storage.

In an illustrated embodiment of the invention, the wheeled sample display unit is assembled by vertically stacking a number of box-like cases. Each case is divided approximately in half so as to form front and back half compartments which are joined at one edge by a hinge and at the other by a luggage-type releasable lock.

An assembly manipulating handle is located on the back of the uppermost case of the assembly and the dolly is located on the bottom of the lowermost case. This dolly has two parts hinged together in a manner similar to the case to which it is attached.

Each case may also be provided with front and rear grips so that it can be carried separately to a vehicle and conveniently located within it. The interior of each case has a number of display trays in each of the two compartments and, if desirable, advertising information may be provided on the outer edge of the trays or in a similar location.

After the salesman has arrived at the customer's location the case with the dolly attached is placed on the ground and the other cases are stacked on top. Latches located on each case are then operated to fasten them all together. Using the manipulating handle the display unit is wheeled to the site of the demonstration. There the luggage-type locks on each case are released and the display is swung open to permit convenient access to each of the display trays already properly arranged. This opening of the display is assisted by the hinged dolly whose wheeled front part can be easily pushed away from its rear part, thereby carrying the front section of each case away from the rear section and exposing the trays inside.

BRIEF DESCRIPTION OF THE DRAWINGS

The foregoing and other features of the present invention will be more readily apparent from the following detailed description and drawings of an illustrative embodiment of the invention in which:

FIGS. 1–4 are front, rear, side and top views, respectively, of a three-case version of a wheeled sample display unit according to the present invention;

FIG. 5 shows the display unit in an open position;

DESCRIPTION OF THE EXEMPLARY EMBODIMENT

Figure 1:
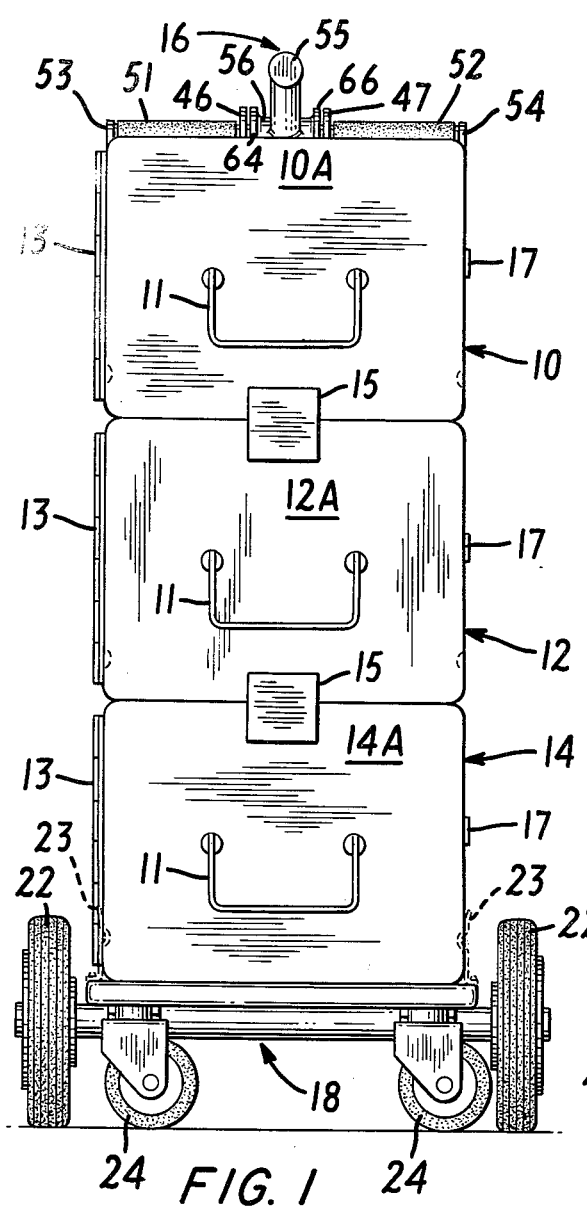
Figure 2:
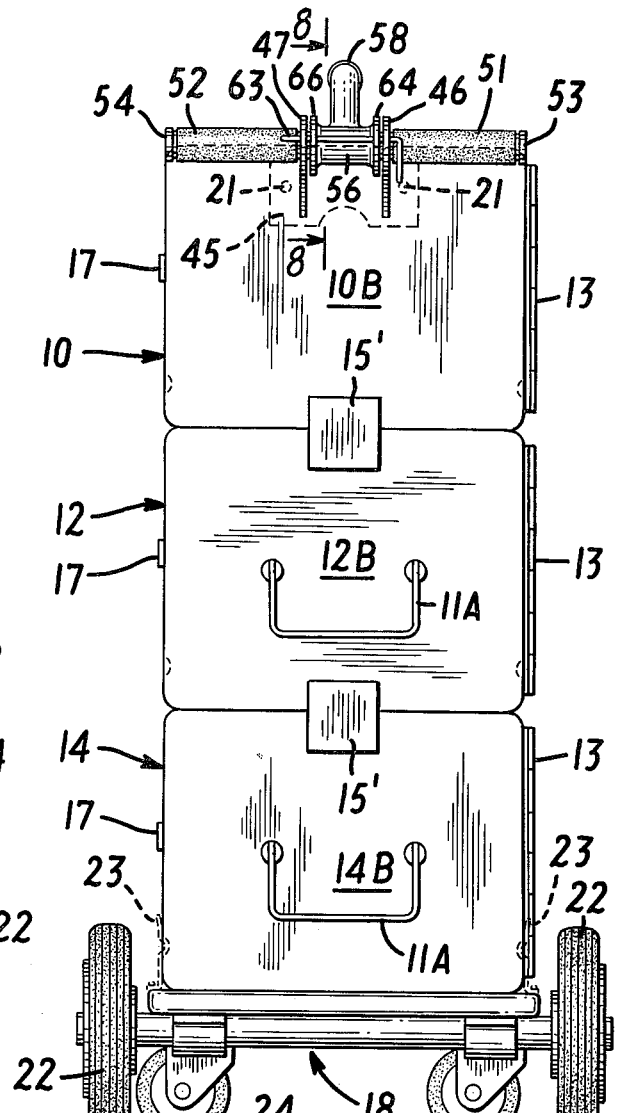

The wheeled sample display unit shown in the drawings has three sample cases (10, 12 and 14) stacked in a vertical arrangement and held together by latches 15 on the front of the cases and latches 15' on the rear of the cases. The case 10 is shown with an assembly handle 16 attached to it and described in detail below. This handle is preferably permanently attached to the uppermost case, in this embodiment case 10, of the assembled units by means of fasteners 21 (FIG. 2). The handle 16 may be pivoted to a storage position thereby making it easier to pack the several cases in a confined space. It may also be removably attached to the case 10, if desired.

The nested cases are carried by a dolly 18 also described below. The lowermost case 14 may be permanently attached to the dolly or it may be connected to it by means of standard releasable fasteners 23 fixed to the dolly and shown in dotted line in FIGS. 1–4 and 6. Separation of the dolly 18 from the case 14 also allows for ease of storage.

Figure 6:
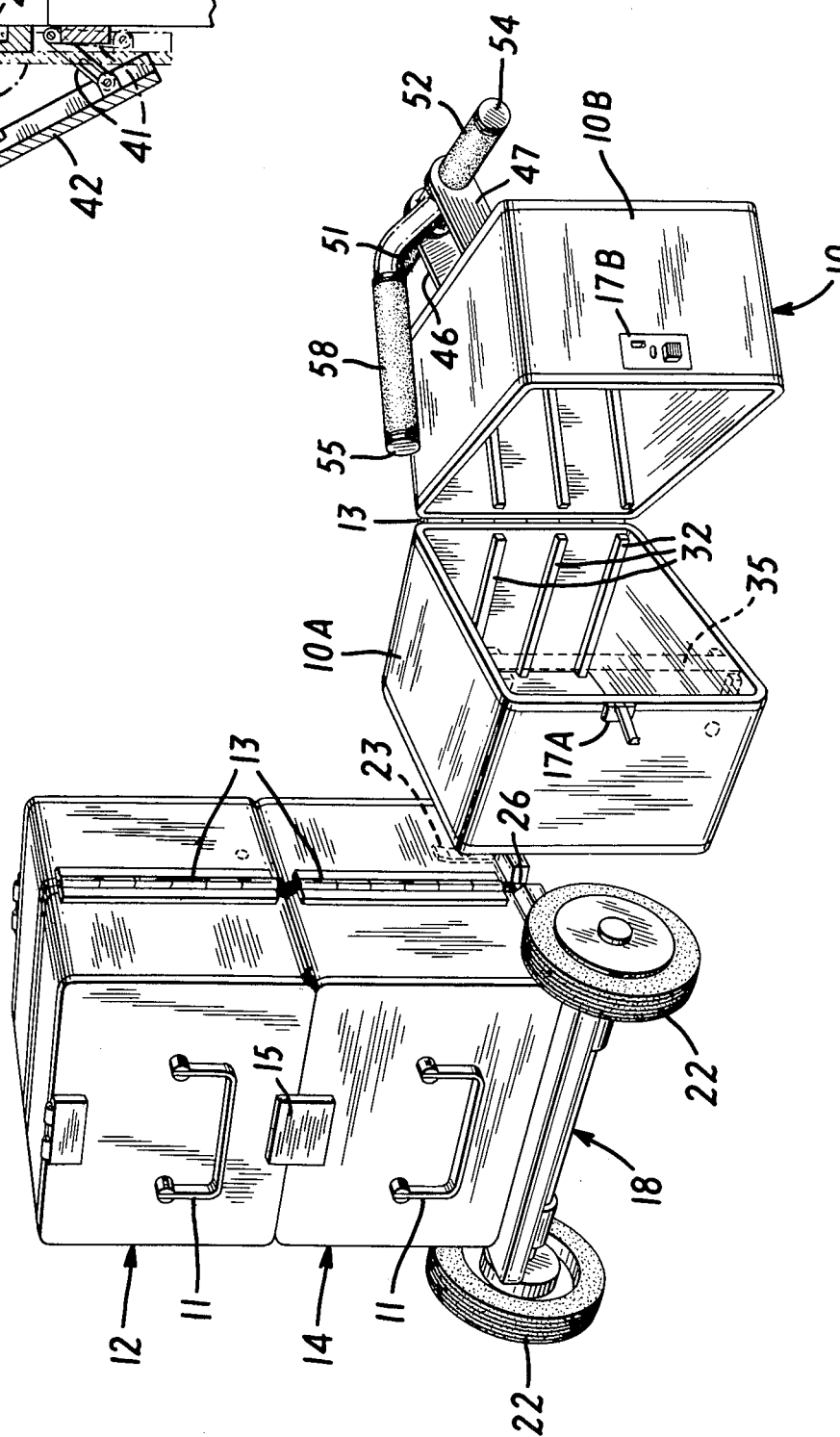
FIG. 6 shows the uppermost case detached from the rest of the display unit.

Each sample case, e.g. the case 10 seen best in FIG. 6, has a front compartment 10A and a rear compartment 10B which are joined by a hinge 13 located along one side. The two compartments of the case may be locked together by means of a latch 17 located opposite the hinge. As shown in FIGS. 3 and 6, a luggage-type latch with parts 17A on the front compartment of the case and 17B on the rear compartment would be suitable for this purpose. The front and rear walls of each case also have carrying grips 11 and 11A respectively, which facilitate both the carrying of the cases individually and their being pivoted open to the display position. On the interior of each compartment there is a series of tray support racks 32 which hold display trays 30 as best seen in FIGS. 5 and 6. The trays 30 may be nestable so that one or more, perhaps as many as three, can be supported together by each set of support racks. In this way, nearly all of the available interior space of each of the compartments can be utilized for carrying the sample items. As a variation, vertical trays such as trays 35 in FIG. 6 or a combination of vertical and horizontal trays may be utilized.

The dolly 18 is made from two sections, 18A and 18B (FIGS. 3 and 5), which are hinged at one side by a hinge 26 so that the dolly pivots horizontally between open and closed positions. The front section 18A of the dolly has four small pivotally mounted wheels or casters 24, one at each of its corners. The rear section 18B of the dolly is supported by two larger tire covered wheels 22 which may not pivot. A latch mechanism 19 may be provided on the dolly to hold the two sections together while the assembled unit is being transported. A latch with part 19A on the dolly section 18A and mating part 19B on the dolly section 18B, as shown in FIGS. 3 and 5, would be suitable for this purpose.

The sample cases are aligned on the dolly such that the front compartments, such as 10A, are supported by the front section 18A of the dolly. The rear compartments, e.g. 10B are similarly supported by the rear section 18B of the dolly. When properly connected together, the case hinges 13 and the dolly hinge 26 are substantially vertically aligned so that the dolly and the cases may be pivoted together horizontally between open and closed positions. When the cases are fixed together and to the dolly, as described above, they may be opened simultaneously with the dolly to the position shown in FIG. 5. Of course, the hinged cases 10 may be of any convenient shape and one or more may be used in the foregoing manner with the dolly 18.

Figure 7:
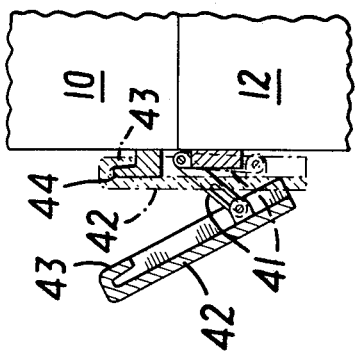
FIG. 7 is a partial side view of a latch mechanism for releasably holding the sample cases together in stacked position.

The lock mechanisms 15 and 15' for releasably holding the sample cases together in their stacked positions may be of any appropriate type. One form of such a mechanism is shown in FIG. 7. In this arrangement, the lock for each of the cases consists of a linking element 41 pivotally interconnecting a latch plate 42 with one sidewall of the case e.g. case 12, substantially adjacent its top surface. The latch plate is provided with an inwardly facing, generally downwardly projecting hook element 43. Each case, e.g. case 10, is also provided with an outwardly and upwardly directed hook 44 connected to the same sidewall substantially adjacent its lower surface. In connecting a pair of cases together, such as the cases 10 and 12, the latch plate of the lower case 12 is moved upwardly so that its hook 43 fits over the corresponding hook 44 on the upper case 10 and into the locked position shown in dotted line in FIG. 7.

Figure 4:
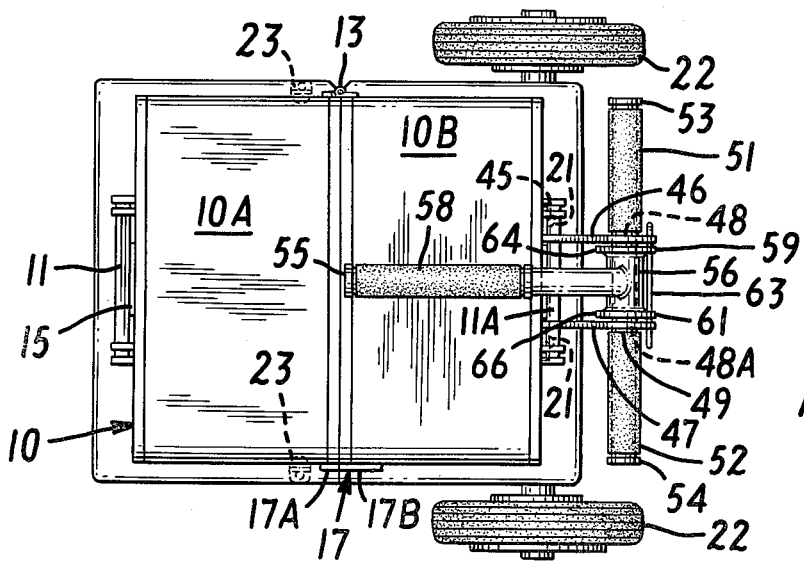
Figure 8:
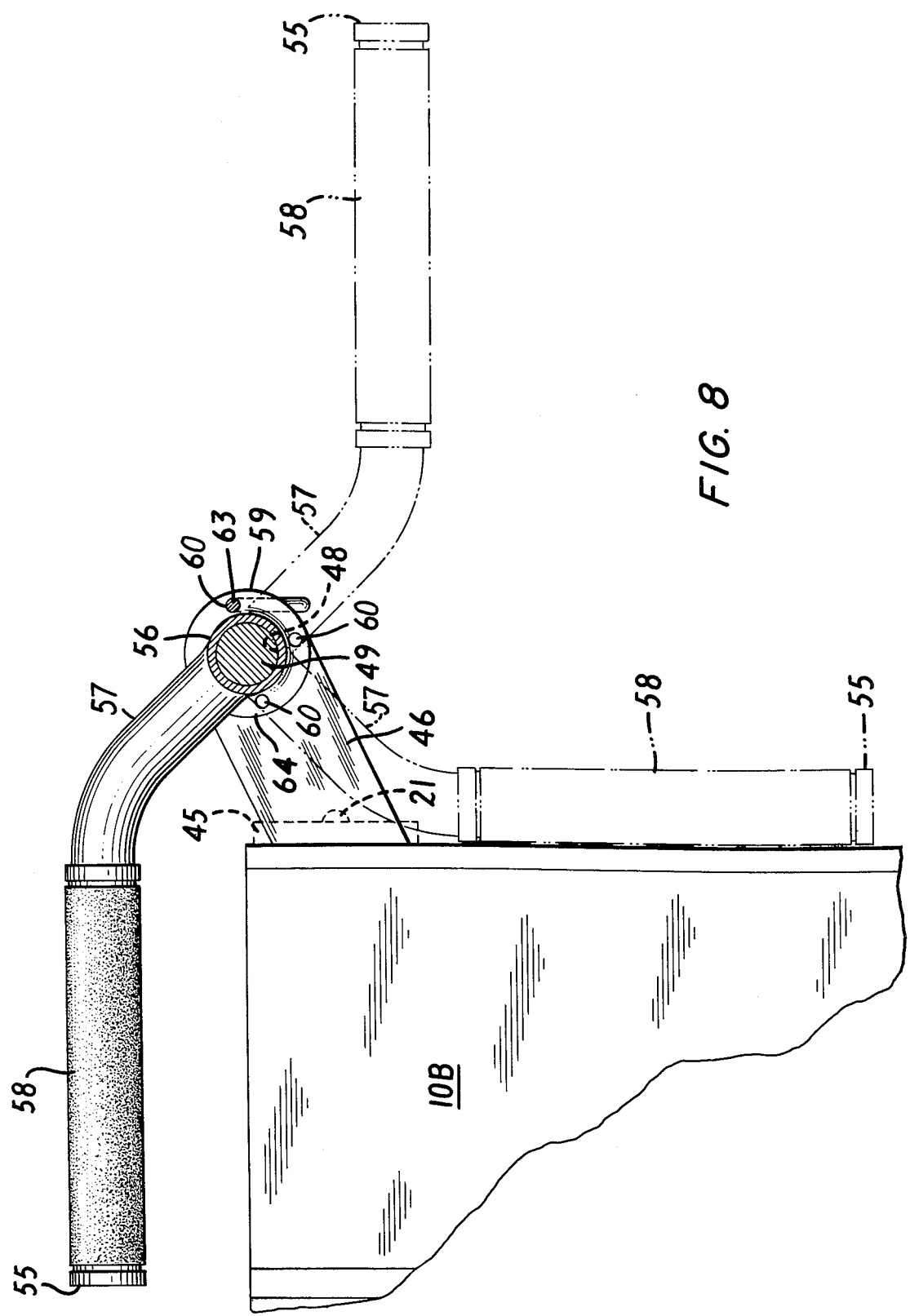
FIG. 8 is a sectional view of the assembly transport handle taken along the line 8—8 of FIG. 2.

Referring to FIGS. 3, 4 and 8, there is shown a preferred embodiment for the assembly handle 16. The handle includes a mounting plate 45 secured to the rear sidewall of the case 10, for example, by the fasteners 21. The mounting plate may be inside or outside the case, as desired. A pair of spaced apart generally parallel support struts 46 and 47 are connected to and extend laterally rearwardly and coextensively from the mounting plate. Each of the struts contains an opening 48 and 48A, respectively, adjacent its distal end. The openings 48 and 48A are aligned concentrically to receive an axle member 49 which passes horizontally completely through the openings so as to be centrally supported by the struts and which extends transversely along and parallel to the rear sidewall of the case. Each of the free standing end portions 51 and 52 of the axle outside of or beyond the struts is suitably shaped or covered, e.g. with vinyl, to constitute a hand grip. The axle member and its hand grips together form a transverse handle to facilitate transport of the case assembly. The ends of the grips may be covered with appropriate end caps 53 and 54.

In the present embodiment, a hollow generally spool-shaped hub member 56 is rotatably mounted on the axle 49 between the struts. An arm 57 is fixed to the hub to turn therewith and protrudes generally radially outwardly therefrom to be able to extend over the top of the case 10. The free end of the arm 57 is formed with a generally linear shaft section to define another hand grip or longitudinal handle 58. This longitudinal grip is also suitably shaped or covered with vinyl and may be provided with an end cap 55 similar to the caps 53 and 54 on the transverse handle.

In this embodiment, the arm 57 may be pivoted or rotated between two substantially horizontal transport positions and one generally vertical storage position. The three fixed positions are shown in FIGS. 3 and 8, two of them in a broken line. The arm is fixed into each of its positions by a suitable stop mechanism affecting rotation of the hub 56. For example, the hub may be provided with at least one but preferably a matched pair of radially extending members 59 and 61 coextensive with and preferably adjacent the support struts 46 and 47. Each of these members is provided with a plurality of locking holes 60 adjacent its periphery. The locking holes are located so that upon rotation of the hub, they become successively aligned with a corresponding pair of peripheral holes 62 (FIG. 3) formed in the struts. A locking pin 63 may be inserted through the holes 62 and through the holes 60 of the hub to secure the arm in each of its intended positions.

In the case of the generally spool-shaped hub 56, the locking holes may be formed near the periphery of each of the spool rim or ridge portions 64 and 66 (FIG. 4) adjacent the struts. This enables quick and accurate passage of the locking pin 63 through the aligned holes to the locked position, as seen in FIGS. 2 and 4.

The present invention permits a salesman to transport and display conveniently a large number of sample items. Each of the sample cases may be loaded and transported separately, for example, in the trunk of an automobile. Movement of the cases to and from the automobile is facilitated by their being vertically stacked in the desired configuration and locked to each other by latches 15.

Either of the grips 51, 52 or 58 may be used for pushing the case assembly along on the dolly. For transporting the cases in an upright manner an arm 57 should be located in the forward extending position overlying the case 10. Alternatively it may be lowered to the storage position in which it lies vertically adjacent or against the rear sidewall of the case. When it becomes necessary to transport the assembly in an upright and tilted manner, such as required for guiding the case assembly over curbs or steps, the arm 57 may be moved to and locked into its rearwardly extending position, shown in FIGS. 3 and 8. Appropriate lever action for tilting the unit may thereby be applied smoothly and efficiently.

Upon reaching his car the salesman would open the latches 15 and 15', thereby separating the assembly into its individual cases, and each case would be stored in his vehicle in a convenient location, e.g. the trunk or the seats of an automobile. If necessary the dolly 18 can be detached from its case. The handle arm 57 may be set into its vertical storage position to save space.

At the customer's building the unit is easily and quickly assembled without tools and is pushed or pulled via the assembly handle 16 to the customer's studio or store within the building. In order to display his products to the customer, the salesman need only release locks 17 and 19 and push the front compartments of the assembled cases, including the dolly, away from the rear compartments, thus exposing for convenient access the prearranged trays within each case. Opening of the unit is aided by the four pivotal wheels 24 on the front section of the dolly and by the handles or grips 11 and 11A on the front and back respectively of each case.

While the present invention has been particularly shown and described with reference to a preferred embodiment thereof, it will be understood by those skilled in the art that various changes in form and details may be made therein without departing from the spirit and scope of the invention.

What is claimed is:

1. A sample display unit comprising
    a plurality of stackable display cases, each having front and rear compartments hingedly mounted for movement towards and away from each other between open and closed positions,
    cooperating means on each of said display cases for retaining adjacent display cases releasably in vertically stacked relation for pivotal movement of their front and rear compartments as units about a common vertical axis, and
    a wheeled dolly having substantially coplanar front and rear platform sections hingedly mounted for angular movement towards and away from one another, said dolly being secured to the bottom one of said display cases for integral movement of the display case front and rear compartments with the dolly front and rear sections, respectively, about said common vertical axis.

2. A sample display case as defined in claim 1 together with means retaining said front and rear compartments and said front and rear dolly sections releasably in the closed position, and handle means on at least one of said display cases to facilitate moving said sample display unit.

3. A sample display case as defined in claim 2 in which one of the dolly platform sections is supported on pivotally mounted casters and the other dolly platform section is supported on larger wheels mounted on a fixed axle.

4. A sample display case as defined in claim 3 in which each display case is provided with separate handle means facilitating its handling apart from the others and has a plurality of display trays supported therein.

5. A sample display case as defined in claim 2 in which said handle means comprises a plurality of spaced apart brackets secured on one of said display cases, a first bar like handle carried by said brackets and having handgrip portions extending away therefrom on opposite sides thereof, a second bar like handle mounted on said first handle intermediate the ends thereof and swingable in a plane perpendicular to said first handle from a downwardly depending rest position to either of two operating positions, one directed away from said display case and substantially perpendicular thereto, and the other directed towards and overlying said display case, and means locking said second handle releasably and selectively in any one of said rest and operating positions.

6. A wheeled display unit as claimed in claim 1 further including a handgrip detachably secured to the uppermost of the vertically-stacked cases.

7. A wheeled display unit as claimed in claim 6 wherein said handgrip is permanently attached to the uppermost vertically-stacked case and said dolly is permanently attached to the lowermost vertically-stacked case.

8. A wheeled display unit as claimed in claim 6 wherein said handgrip is detachably connected to the uppermost vertically-stacked case and said dolly is detachably attached to the lowermost vertically-stacked case.

9. A wheeled sample display unit comprising
    a plurality of vertically stackable box-like cases with front, back, top and two side walls, each case having a front compartment including the front wall and a portion of the top, bottom and side walls and a back compartment including the back wall and the remaining portions of the top, bottom and side walls, the front and back compartments being joined by a vertical hinge along one of the side walls so as to permit the front compartment to pivot away from the back compartment in the horizontal plane, a latch means on the other side wall of the case for releasably locking the hinged compartments together, the interior of each compartment containing tray support members for supporting a plurality of display trays, a carrying handle being located on the front wall of each case;
    releasable retaining means arranged opposite each other in a horizontal plane for fastening the cases together in a vertically-stacked arrangement;
    a handgrip attachable to the uppermost case of the vertically-stacked arrangement of cases to facilitate movement of the sample display unit; and
    a wheeled dolly attachable to the lowermost of said cases for supporting the vertically-stacked cases, said dolly having a front wheeled platform section supported on pivotable casters and a rear wheeled platform section supported on wheels mounted on a fixed axle, said front and rear platform sections being hinged together in such a manner as to allow the front section to pivot away from the rear section coaxially and integrally with the front and back case compartments about a common axis.

* * * * *